(12) United States Patent
Elshafie et al.

(10) Patent No.: US 11,569,876 B2
(45) Date of Patent: Jan. 31, 2023

(54) BEAM INDEX REPORTING BASED AT LEAST IN PART ON A PRECODED CHANNEL STATE INFORMATION REFERENCE SIGNAL

(71) Applicant: QUALCOMM Incorporated, San Diego, CA (US)

(72) Inventors: Ahmed Elshafie, San Diego, CA (US); Ahmed Abdelaziz Ibrahim Abdelaziz Zewail, San Diego, CA (US); Hwan Joon Kwon, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 0 days.

(21) Appl. No.: 17/447,543

(22) Filed: Sep. 13, 2021

(65) Prior Publication Data

US 2022/0085852 A1 Mar. 17, 2022

Related U.S. Application Data

(60) Provisional application No. 63/078,698, filed on Sep. 15, 2020.

(51) Int. Cl.
*H04B 7/02* (2018.01)
*H04B 7/0456* (2017.01)
*H04L 5/00* (2006.01)
*H04B 7/06* (2006.01)

(52) U.S. Cl.
CPC ......... *H04B 7/0456* (2013.01); *H04B 7/0626* (2013.01); *H04L 5/0048* (2013.01); *H04L 5/0007* (2013.01)

(58) Field of Classification Search
CPC .... H04B 7/0456; H04B 7/0626; H04B 7/063; H04B 7/0478; H04B 7/0663; H04L 5/0048; H04L 5/0007; H04L 5/0051; H04L 5/0025; H04L 5/0053; H04L 5/005
USPC .......................................................... 375/267
See application file for complete search history.

(56) References Cited

U.S. PATENT DOCUMENTS

| | | | |
|---|---|---|---|
| 8,817,904 B2 * | 8/2014 | Collotta | H04B 7/0632 375/267 |
| 10,742,303 B1 * | 8/2020 | Nilsson | H04B 7/063 |
| 10,841,914 B2 * | 11/2020 | Liou | H04W 72/0446 |

(Continued)

FOREIGN PATENT DOCUMENTS

| WO | WO-2017146485 | * | 8/2017 |
|---|---|---|---|
| WO | WO-2020063729 A1 | | 4/2020 |

OTHER PUBLICATIONS

International Search Report and Written Opinion—PCT/US2021/071451—ISA/EPO—dated Jan. 7, 2022.

*Primary Examiner* — Helene E Tayong
(74) *Attorney, Agent, or Firm* — Harrity & Harrity, LLP

(57) ABSTRACT

Various aspects of the present disclosure generally relate to wireless communication. In some aspects, a base station may select a precoding matrix of orthogonal beams. The base station may precode a channel state information reference signal (CSI-RS) transmitted to a user equipment (UE) using the precoding matrix of orthogonal beams. The base station may receive, from the UE, one or more reports that indicate one or more beam indices selected from beam indices associated with the precoding matrix of orthogonal beams. Numerous other aspects are provided.

30 Claims, 9 Drawing Sheets

(56) References Cited

U.S. PATENT DOCUMENTS

| | | | |
|---|---|---|---|
| 2011/0150113 A1* | 6/2011 | Oyman | H04L 25/03343 |
| | | | 375/295 |
| 2014/0341048 A1* | 11/2014 | Sajadieh | H04W 72/0446 |
| | | | 370/252 |
| 2015/0372731 A1* | 12/2015 | Song | H04B 7/0634 |
| | | | 375/267 |
| 2016/0323022 A1* | 11/2016 | Rahman | H04B 7/0469 |
| 2019/0132031 A1 | 5/2019 | Park et al. | |
| 2020/0162289 A1* | 5/2020 | Ahn | H04W 72/0413 |

\* cited by examiner

BEAM INDEX REPORTING BASED AT LEAST IN PART ON A PRECODED CHANNEL STATE INFORMATION REFERENCE SIGNAL

CROSS-REFERENCE TO RELATED APPLICATION

This Patent Application claims priority to U.S. Provisional Patent Application No. 63/078,698, filed on Sep. 15, 2020, entitled "BEAM INDEX REPORTING BASED AT LEAST IN PART ON A PRECODED CHANNEL STATE INFORMATION REFERENCE SIGNAL," and assigned to the assignee hereof. The disclosure of the prior Application is considered part of and is incorporated by reference into this Patent Application.

FIELD OF THE DISCLOSURE

Aspects of the present disclosure generally relate to wireless communication and to techniques and apparatuses for beam index reporting based at least in part on a precoded channel state information reference signal (CSI-RS).

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more base stations that support communication for a user equipment (UE) or multiple UEs. A UE may communicate with a base station via downlink communications and uplink communications. "Downlink" (or "DL") refers to a communication link from the base station to the UE, and "uplink" (or "UL") refers to a communication link from the UE to the base station.

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some aspects, a method of wireless communication performed by a base station includes selecting a precoding matrix of orthogonal beams; precoding a channel state information reference signal (CSI-RS) transmitted to a UE using the precoding matrix of orthogonal beams; and receiving, from the UE, one or more reports that indicate one or more beam indices selected from beam indices associated with the precoding matrix of orthogonal beams.

In some aspects, a method of wireless communication performed by a UE includes receiving, from a base station, a CSI-RS precoded using a precoding matrix of orthogonal beams; selecting one or more beam indices from beam indices associated with the precoding matrix of orthogonal beams; and transmitting, to the base station, one or more reports that indicate the one or more beam indices.

In some aspects, a base station for wireless communication includes a memory and one or more processors, coupled to the memory, configured to: select a precoding matrix of orthogonal beams; precode a CSI-RS transmitted to a UE using the precoding matrix of orthogonal beams; and receive, from the UE, one or more reports that indicate one or more beam indices selected from beam indices associated with the precoding matrix of orthogonal beams.

In some aspects, a UE for wireless communication includes a memory and one or more processors, coupled to the memory, configured to: receive, from a base station, a CSI-RS precoded using a precoding matrix of orthogonal beams; select one or more beam indices from beam indices associated with the precoding matrix of orthogonal beams; and transmit, to the base station, one or more reports that indicate the one or more beam indices.

In some aspects, a non-transitory computer-readable medium storing a set of instructions for wireless communication includes one or more instructions that, when executed by one or more processors of a base station, cause the base station to: select a precoding matrix of orthogonal beams; precode a CSI-RS transmitted to a UE using the precoding matrix of orthogonal beams; and receive, from the UE, one or more reports that indicate one or more beam indices selected from beam indices associated with the precoding matrix of orthogonal beams.

In some aspects, a non-transitory computer-readable medium storing a set of instructions for wireless communication includes one or more instructions that, when executed by one or more processors of a UE, cause the UE to: receive, from a base station, a CSI-RS precoded using a precoding matrix of orthogonal beams; select one or more beam indices from beam indices associated with the precoding matrix of orthogonal beams; and transmit, to the base station, one or more reports that indicate the one or more beam indices.

In some aspects, an apparatus for wireless communication includes means for selecting a precoding matrix of orthogonal beams; means for precoding a CSI-RS transmitted to a UE using the precoding matrix of orthogonal beams; and means for receiving, from the UE, one or more reports that indicate one or more beam indices selected from beam indices associated with the precoding matrix of orthogonal beams.

In some aspects, an apparatus for wireless communication includes means for receiving, from a base station, a CSI-RS precoded using a precoding matrix of orthogonal beams; means for selecting one or more beam indices from beam indices associated with the precoding matrix of orthogonal beams; and means for transmitting, to the base station, one or more reports that indicate the one or more beam indices.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims. The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

Figure 1:
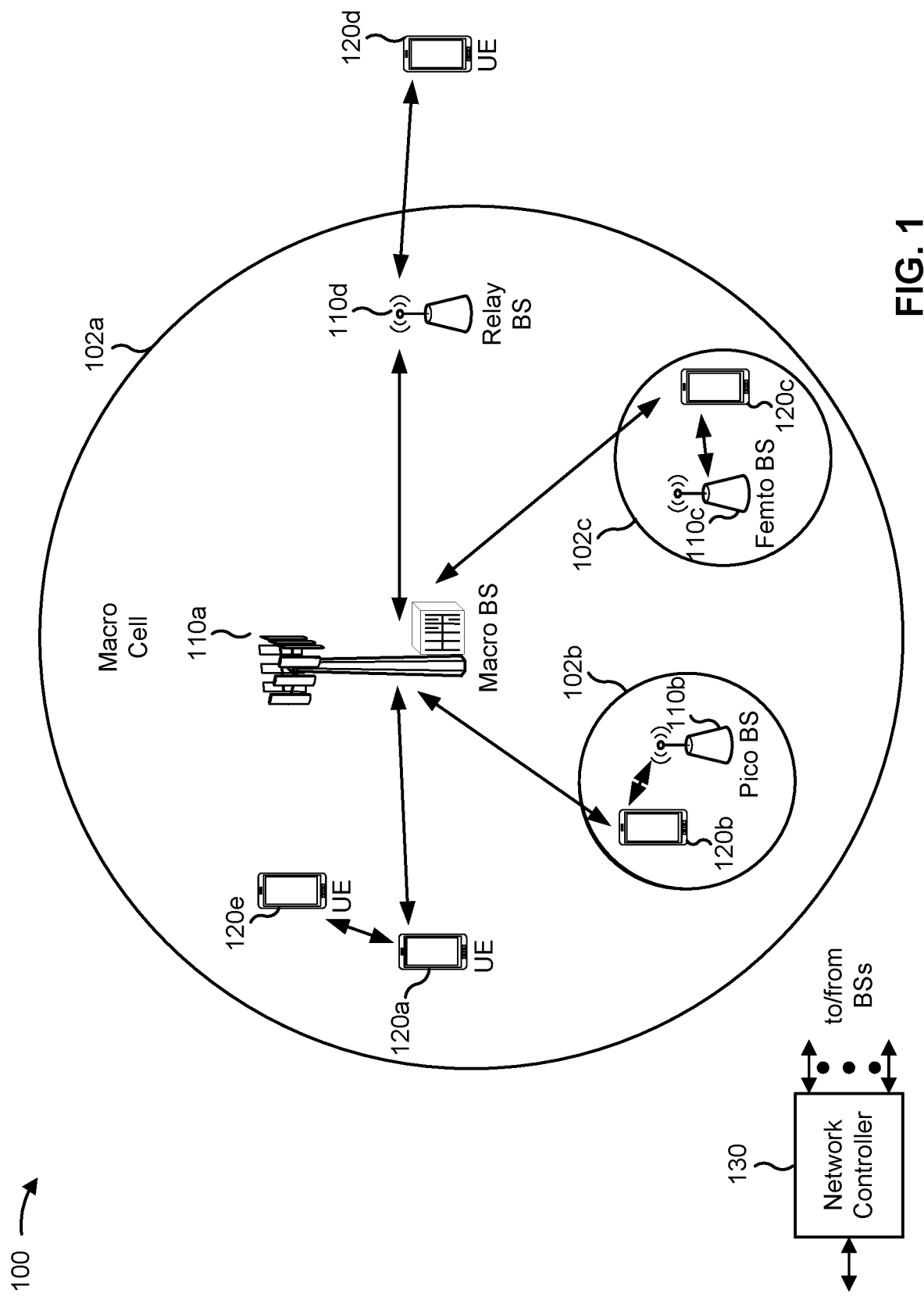
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more base stations 110 (shown as a BS 110a, a BS 110b, a BS 110c, and a BS 110d), a user equipment (UE) 120 or multiple UEs 120 (shown as a UE 120a, a UE 120b, a UE 120c, a UE 120d, and a UE 120e), and/or other network entities. A base station 110 is an entity that communicates with UEs 120. A base station 110 (sometimes referred to as a BS) may include, for example, an NR base station, an LTE base station, a Node B, an eNB (e.g., in 4G), a gNB (e.g., in 5G), an access point, and/or a transmission reception point (TRP). Each base station 110 may provide communication coverage for a particular geographic area. In the Third Generation Partnership Project (3GPP), the term "cell" can refer to a coverage area of a base station 110 and/or a base station subsystem serving this coverage area, depending on the context in which the term is used.

A base station 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscription. A femto cell may cover a relatively small geographic area (e.g., a home) and may allow restricted access by UEs 120 having association with the femto cell (e.g., UEs 120 in a closed subscriber group (CSG)). A base station 110 for a macro cell may be referred to as a macro base station. A base station 110 for a pico cell may be referred to as a pico base station. A base station 110 for a femto cell may be referred to as a femto base station or an in-home base station. In the example shown in FIG. 1, the BS 110a may be a macro base station for a macro cell 102a, the BS 110b may be a pico base station for a pico cell 102b, and the BS 110c may be a femto base station for a femto cell 102c. A base station may support one or multiple (e.g., three) cells.

In some examples, a cell may not necessarily be stationary, and the geographic area of the cell may move according to the location of a base station 110 that is mobile (e.g., a mobile base station). In some examples, the base stations 110 may be interconnected to one another and/or to one or more other base stations 110 or network nodes (not shown) in the wireless network 100 through various types of backhaul interfaces, such as a direct physical connection or a virtual network, using any suitable transport network.

The wireless network 100 may include one or more relay stations. A relay station is an entity that can receive a transmission of data from an upstream station (e.g., a base station 110 or a UE 120) and send a transmission of the data to a downstream station (e.g., a UE 120 or a base station 110). A relay station may be a UE 120 that can relay transmissions for other UEs 120. In the example shown in FIG. 1, the BS 110d (e.g., a relay base station) may communicate with the BS 110a (e.g., a macro base station) and the UE 120d in order to facilitate communication between the BS 110a and the UE 120d. A base station 110 that relays communications may be referred to as a relay station, a relay base station, a relay, or the like.

The wireless network 100 may be a heterogeneous network that includes base stations 110 of different types, such as macro base stations, pico base stations, femto base stations, relay base stations, or the like. These different types of base stations 110 may have different transmit power levels, different coverage areas, and/or different impacts on interference in the wireless network 100. For example, macro base stations may have a high transmit power level (e.g., 5 to 40 watts) whereas pico base stations, femto base stations, and relay base stations may have lower transmit power levels (e.g., 0.1 to 2 watts).

A network controller 130 may couple to or communicate with a set of base stations 110 and may provide coordination and control for these base stations 110. The network controller 130 may communicate with the base stations 110 via a backhaul communication link. The base stations 110 may communicate with one another directly or indirectly via a wireless or wireline backhaul communication link.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, and/or any other suitable device that is configured to communicate via a wireless medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a base station, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the base station 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

As indicated above, FIG. 1 is provided as an example. Other examples may differ from what is described with regard to FIG. 1.

Figure 2:
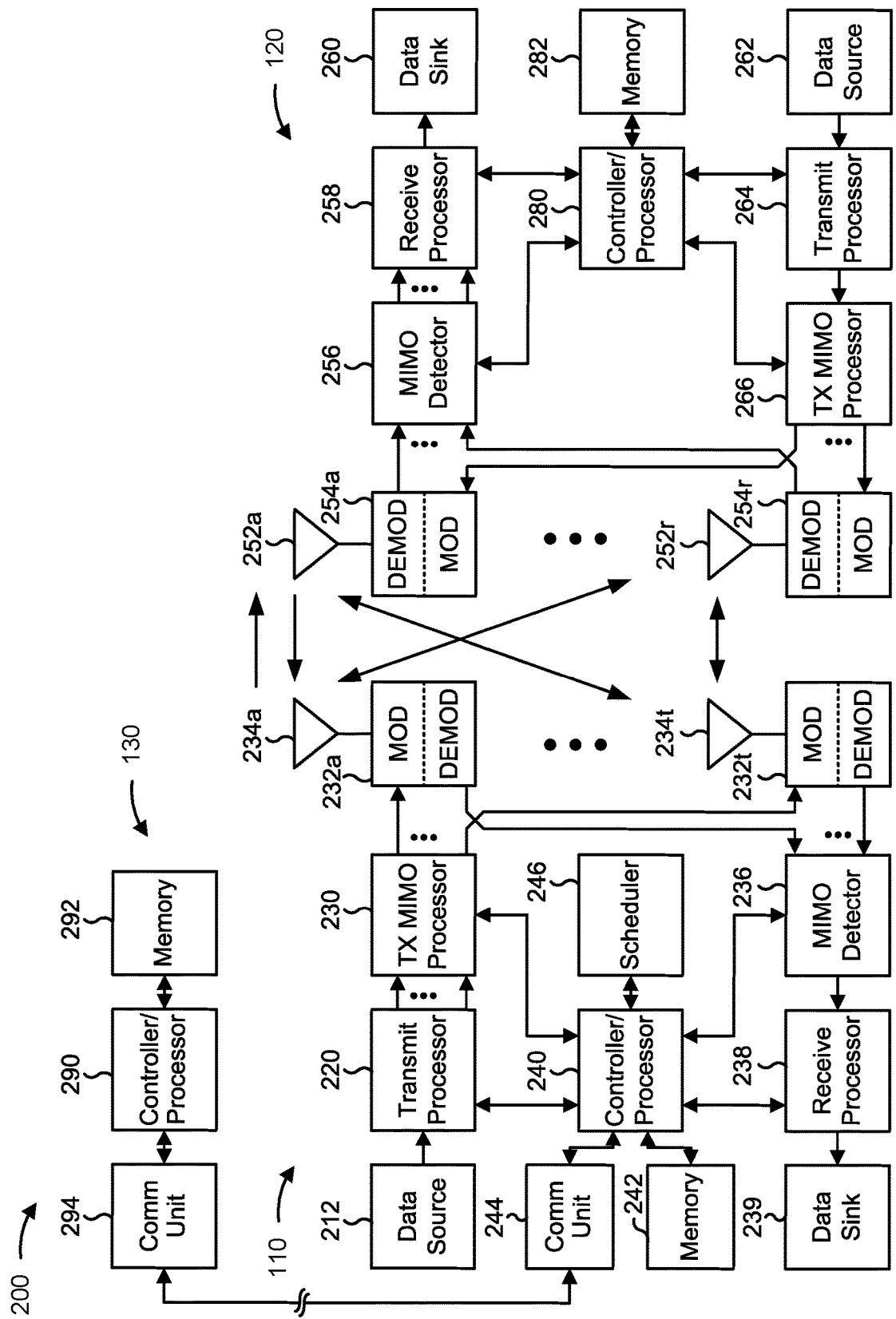
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. The base station 110 may be equipped with a set of antennas 234a through 234t, such as T antennas (T≥1). The UE 120 may be equipped with a set of antennas 252a through 252r, such as R antennas (R≥1).

At the base station 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The base station 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232a through 232t. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232a through 232t may transmit a set of downlink signals (e.g., T downlink signals) via a corresponding set of antennas 234 (e.g., T antennas), shown as antennas 234a through 234t.

At the UE 120, a set of antennas 252 (shown as antennas 252a through 252r) may receive the downlink signals from the base station 110 and/or other base stations 110 and may provide a set of received signals (e.g., R received signals) to a set of modems 254 (e.g., R modems), shown as modems 254a through 254r. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the base station 110 via the communication unit 294.

One or more antennas (e.g., antennas 234a through 234t and/or antennas 252a through 252r) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the base station 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 5-9).

At the base station 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The base station 110 may include a communication unit 244 and may communicate with the network controller 130 via the communication unit 244. The base station 110 may include a scheduler 246 to schedule one or more UEs 120 for downlink and/or uplink communications. In some examples, the modem 232 of the base station 110 may include a modulator and a demodulator. In some examples, the base station 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 5-9).

The controller/processor 240 of the base station 110, the controller/processor 280 of the UE 120, and/or any other component(s) of FIG. 2 may perform one or more techniques associated with beam index reporting based at least in part on a precoded channel state information reference signal (CSI-RS), as described in more detail elsewhere herein. For example, the controller/processor 240 of the base station 110, the controller/processor 280 of the UE 120, and/or any other component(s) of FIG. 2 may perform or direct operations of, for example, process 600 of FIG. 6, process 700 of FIG. 7, and/or other processes as described herein. The memory 242 and the memory 282 may store data and program codes for the base station 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 600 of FIG. 6, process 700 of FIG. 7, and/or other processes as described herein. In some examples, executing instructions may include running the instructions, converting the instructions, compiling the instructions, and/or interpreting the instructions, among other examples.

In some aspects, a base station (e.g., base station 110) may include means for selecting a precoding matrix of orthogonal beams, means for precoding a CSI-RS transmitted to a UE using the precoding matrix of orthogonal beams, and/or means for receiving, from the UE, one or more reports that indicate one or more beam indices selected from beam indices associated with the precoding matrix of orthogonal beams. In some aspects, such means may include one or more components of base station 110 described in connection with FIG. 2, such as antenna 234, DEMOD 232, MIMO detector 236, receive processor 238, controller/processor 240, transmit processor 220, TX MIMO processor 230, MOD 232, and/or antenna 234.

In some aspects, a UE (e.g., UE 120) may include means for receiving, from a base station, a CSI-RS precoded using a precoding matrix of orthogonal beams, means for selecting one or more beam indices from beam indices associated with the precoding matrix of orthogonal beams, and/or means for transmitting, to the base station, one or more reports that indicate the one or more beam indices. In some aspects, such means may include one or more components of UE 120 described in connection with FIG. 2, such as controller/processor 280, transmit processor 264, TX MIMO processor 266, MOD 254, antenna 252, DEMOD 254, MIMO detector 256, and/or receive processor 258.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Figure 3:
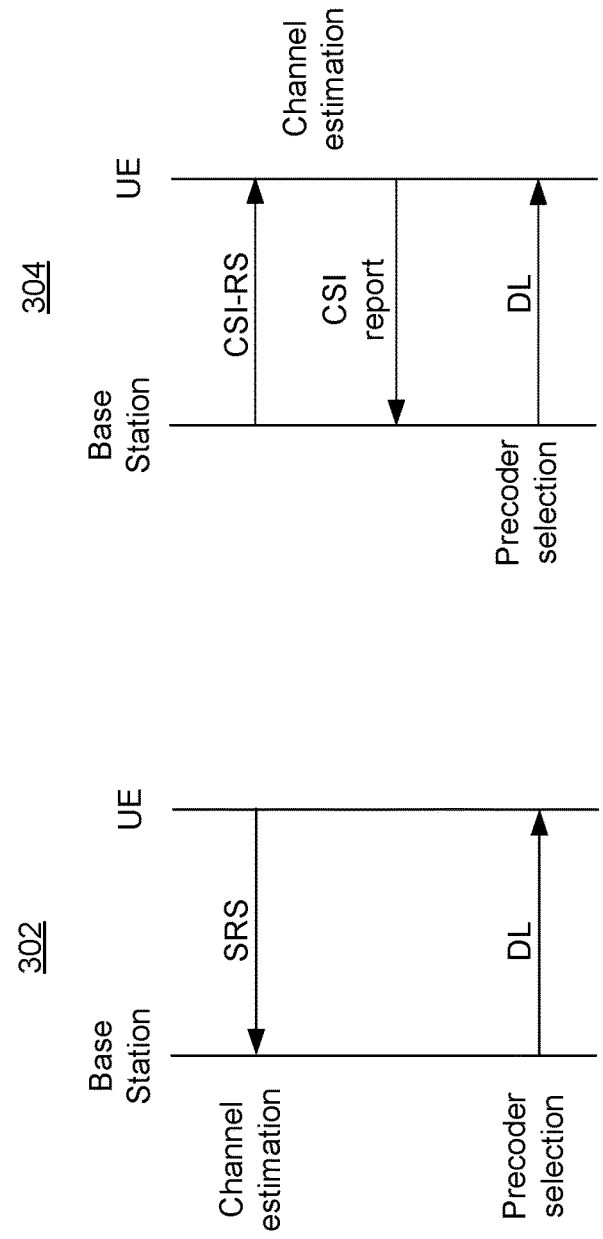
FIG. 3 is a diagram illustrating an example of a channel state information (CSI) framework, in accordance with the present disclosure.

FIG. 3 is a diagram illustrating an example 300 of a channel state information (CSI) framework, in accordance with the present disclosure.

As shown by reference number 302, a UE may transmit a sounding reference signal (SRS) in an uplink to a base station. The base station may perform a channel estimation to estimate a channel between the base station and the UE based at least in part on the SRS received from the UE. The base station may select a precoder based at least in part on the channel estimation. The base station may apply the precoder to a downlink transmission to the UE.

As shown by reference number 304, a base station may transmit a CSI-RS in a downlink to a UE. The UE may perform a channel estimation to estimate a channel between the UE and the base station based at least in part on the CSI-RS received from the base station. In other words, the UE may perform the channel estimation to identify CSI associated with the channel between the UE and the base station. The UE may transmit, to the base station, a CSI report (or CSI feedback). The base station may select a precoder based at least in part on the CSI report received from the UE. The base station may apply the precoder to a downlink transmission to the UE.

As indicated above, FIG. 3 is provided as an example. Other examples may differ from what is described with regard to FIG. 3.

Figure 4:
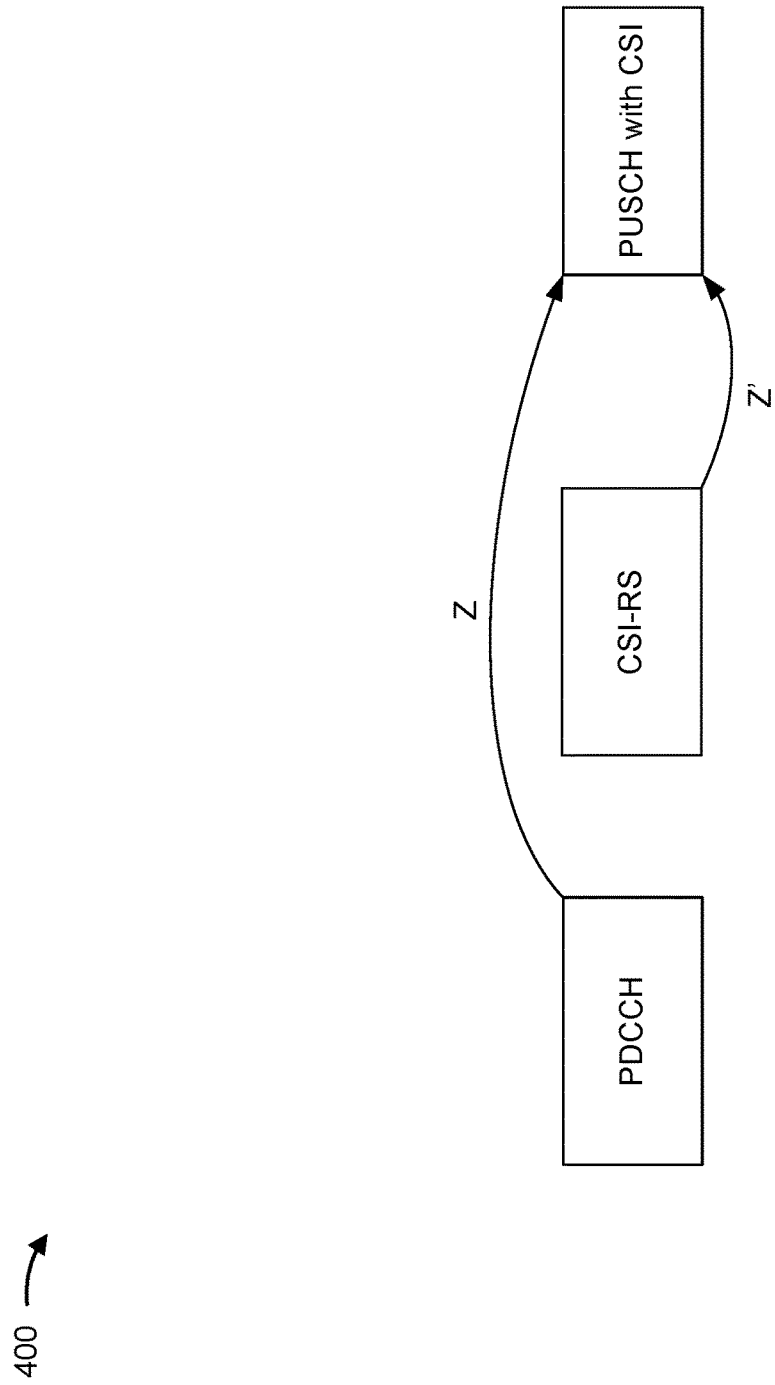
FIG. 4 is a diagram illustrating an example of a CSI feedback timeline, in accordance with the present disclosure.

FIG. 4 is a diagram illustrating an example 400 of a CSI feedback timeline, in accordance with the present disclosure.

As shown in FIG. 4, an evaluation of a CSI feedback timeline may involve at least three values. A Z value may define a number of symbols between a last physical downlink control channel (PDCCH) symbol and a first uplink transmit symbol. A Z' value may define a number of symbols between an end of a CSI-RS symbol and the first uplink transmit symbol. A KB value may define a number of symbols between the PDCCH and beam switching (for millimeter wave cases). The Z and Z' values may be configured according to a latency requirement. For example, the Z and Z' values may be configured by a base station accordingly for a low latency scenario, a medium latency scenario, and/or a high latency scenario.

As indicated above, FIG. 4 is provided as an example. Other examples may differ from what is described with regard to FIG. 4.

A UE may determine CSI feedback associated with a channel between the UE and a base station. The CSI feedback may be included in a CSI report transmitted from the UE to the base station. The CSI feedback may support a plurality of antenna configurations. The CSI feedback may be based at least in part on a dual stage codebook when the UE is configured with four or more antenna ports. One example of the dual stage codebook may be a precoding matrix indicator (PMI) codebook. A PMI codebook may be associated with a precoder structure, which may be defined by $W=W_1 W_2$. In other words, the precoder structure (W) may be a product of $W_1$ and $W_2$, where $W_1$ may represent long-term or wideband properties of the channel, and $W_2$ may represent short-term or sub-band (e.g., a sub-band including a set of resource blocks) properties of the channel. The $W_1$ may be defined according to $$W_1 = \begin{bmatrix} B & 0 \\ 0 & B \end{bmatrix},$$

where B may correspond to L oversampled two-dimensional discrete Fourier transform (DFT) beams, wherein L is a positive integer.

A CSI feedback timeline may involve a UE selecting a set of beams given the precoding structure of the PMI codebook. A search complexity of $W_1$ and $W_2$ for the beam selection may increase depending on a number of antenna ports and layers, and may result in increased power consumption at the UE. Further, an increased search complexity may delay a reporting time of the CSI feedback (e.g., the base station may wait an increased period of time to receive the CSI feedback from the UE).

For example, the search complexity of a $W_1$ computation performed at the UE may be an $O_1, O_2, N_1, N_2$ beam search, where $O_1$ and $O_2$ indicate DFT oversampling values, and $N_1$ and $N_2$ are based at least in part on a number of antennas in a horizontal dimension and a vertical dimension. In the case of 32 antenna ports, the $O_1, O_2, N_1, N_2$ beam search may correspond to a 256 beam search, where $O_1$ and $O_2$ are equal to four. In this example, the 256 beam search may increase a complexity and power consumption at the UE, as well as result in an increased beam reporting time.

In various aspects of techniques and apparatuses described herein, a base station may precode a CSI-RS transmitted to a UE using an orthogonal set of beams. The orthogonal set of beams may be a subset of a plurality of possible beams. For example, the base station may precode the CSI-RS using a subset of $N_1, N_2$ orthogonal DFT beams. The UE may perform a $W_1$ computation based at least in part on the subset of $N_1, N_2$ orthogonal DFT beams, as opposed to performing the $W_1$ computation based at least in part on $O_1, O_2, N_1, N_2$ orthogonal DFT beams. The precoding of the CSI-RS using the subset of $N_1, N_2$ orthogonal beams may reduce a complexity at the UE, reduce an amount of power consumed at the UE, and reduce a CSI feedback timeline for computing and transmitting a CSI report that includes the computed $W_1$.

In some aspects, the reduced CSI feedback timeline may result in a reduced Z' value. For example, a number of symbols between an end of a CSI-RS symbol and a first uplink transmit symbol, as defined by the Z' value, may be reduced when the UE performs the $W_1$ computation with reduced complexity and reduced power consumption. Since the UE may report the computed $W_1$ to the base station in a reduced amount of time, the UE may begin performing an uplink transmission in a reduced amount of time as well.

In some aspects, a plurality of possible beams (F) may be defined by: $F=\mathrm{kron}(\mathrm{DFT}_{O_1 N_1 | N_1\ columns}, \mathrm{DFT}_{O_2 N_2 | N_2\ columns})$, where F may be a matrix having a size equal to $O_1, O_2, N_1, N_2$ times $N_1, N_2$, where kron represents a Kronecker product. Further, $\mathrm{DFT}_{O_1 N_1 | N_1\ columns}$ may be equal to:

$$\begin{bmatrix} 1 & 1 & 1 & \ldots & 1 \\ 1 & e^{\frac{j2\pi}{O_1 N_1}} & e^{\frac{j2\pi(2)}{O_1 N_1}} & \ldots & e^{\frac{j2\pi(N_1-1)}{O_1 N_1}} \\ 1 & e^{\frac{j2\pi(2)}{O_1 N_1}} & e^{\frac{j2\pi(4)}{O_1 N_1}} & \ldots & e^{\frac{j2\pi(2)(N_1-1)}{O_1 N_1}} \\ \vdots & \vdots & \vdots & \vdots & \vdots \\ 1 & e^{\frac{j2\pi(O_1 N_1-1)}{O_1 N_1}} & e^{\frac{j2\pi(O_1 N_1-1)(2)}{O_1 N_1}} & \ldots & e^{\frac{j2\pi(O_1 N_1-1)(N_1-1)}{O_1 N_1}} \end{bmatrix}_{O_1 N_1 \times N_1},$$

and DFT$_{O2N2\vert N2 \; columns}$ may be equal to:

$$\begin{bmatrix} 1 & 1 & 1 & \ldots & 1 \\ 1 & e^{\frac{j2\pi}{O_2N_2}} & e^{\frac{j2\pi(2)}{O_2N_2}} & \ldots & e^{\frac{j2\pi(N_2-1)}{O_2N_2}} \\ 1 & e^{\frac{j2\pi(2)}{O_2N_2}} & e^{\frac{j2\pi(4)}{O_2N_2}} & \ldots & e^{\frac{j2\pi(2)(N_2-1)}{O_2N_2}} \\ \vdots & \vdots & \vdots & \vdots & \vdots \\ 1 & e^{\frac{j2\pi(O_2N_2-1)}{O_2N_2}} & e^{\frac{j2\pi(O_2N_2-1)(2)}{O_2N_2}} & \ldots & e^{\frac{j2\pi(O_2N_2-1)(N_2-1)}{O_2N_2}} \end{bmatrix}_{O_2N_2 \times N_2}$$

With respect to the matrix F, starting for a given row, each $O_1=O_2=O=4$ column shift may be orthogonal to each other. In other words, starting from a given column, an $N_1,N_2$ column separated by four may be orthogonal to other $N_1,N_2$ column separated by four. As an example, $N_2$ may be one, $O_2$ may be one, $N_2$ may be four, and $O_1$ may be four. A first set of orthogonal beams may correspond to 0, 4, 8, 12, . . . rows of the matrix F. A second set of orthogonal beams may correspond to 1, 5, 9, 13, . . . rows of the matrix F. A third set of orthogonal beams may correspond to 2, 6, 10, 14, . . . rows of the matrix F. A fourth set of orthogonal beams may correspond to 3, 7, 11, 15, . . . rows of the matrix F. A next set of orthogonal beams may be a repetition of the first set, and so on.

In some aspects, the matrix F may be divided into $O_1O_2$ submatrices, where each submatrix (or subset) may be composed of $N_1,N_2$ orthogonal beams. In other words, each submatrix may be composed of an orthogonal set of beams. For example, a submatrix i may be denoted $\tilde{F}_i$ where i=1, 2, . . . , $O_1O_2$, and $\tilde{F}_i\tilde{F}_i^* = I_{N_1N_2 \times N_1N_2} \delta_{ij}$ with $\delta_{ij}=1$ for i=j and zero otherwise. A precoder used to precode $2N_1N_2$ ports may be $$F_i = kron(I_{2\times 2}, \tilde{F}_1) = \begin{bmatrix} \tilde{F}_1 & 0 \\ 0 & \tilde{F}_1 \end{bmatrix},$$

and $F_iF_j^* = I_{2N_1N_2 \times 2N_1N_2} \delta_{ij}$ with $\delta_{ij}=1$ for i=j. Here, $\tilde{F}_i$ may be an $N_1N_2 \times N_1N_2$ matrix and may be obtained from matrix F.

In some aspects, a base station may use a subset (or submatrix) of orthogonal beams to precode a CSI-RS transmitted to a UE. The UE may perform a $W_1$ computation based at least in part on the subset of orthogonal beams, as opposed to performing the $W_1$ computation based at least in part on a plurality of beams (e.g., all beams) included in the matrix F. The precoding of the CSI-RS using the subset of orthogonal beams may reduce a complexity at the UE, reduce an amount of power consumed at the UE, and reduce a CSI feedback timeline for computing and transmitting a CSI report that includes the computed $W_1$.

Figure 5:
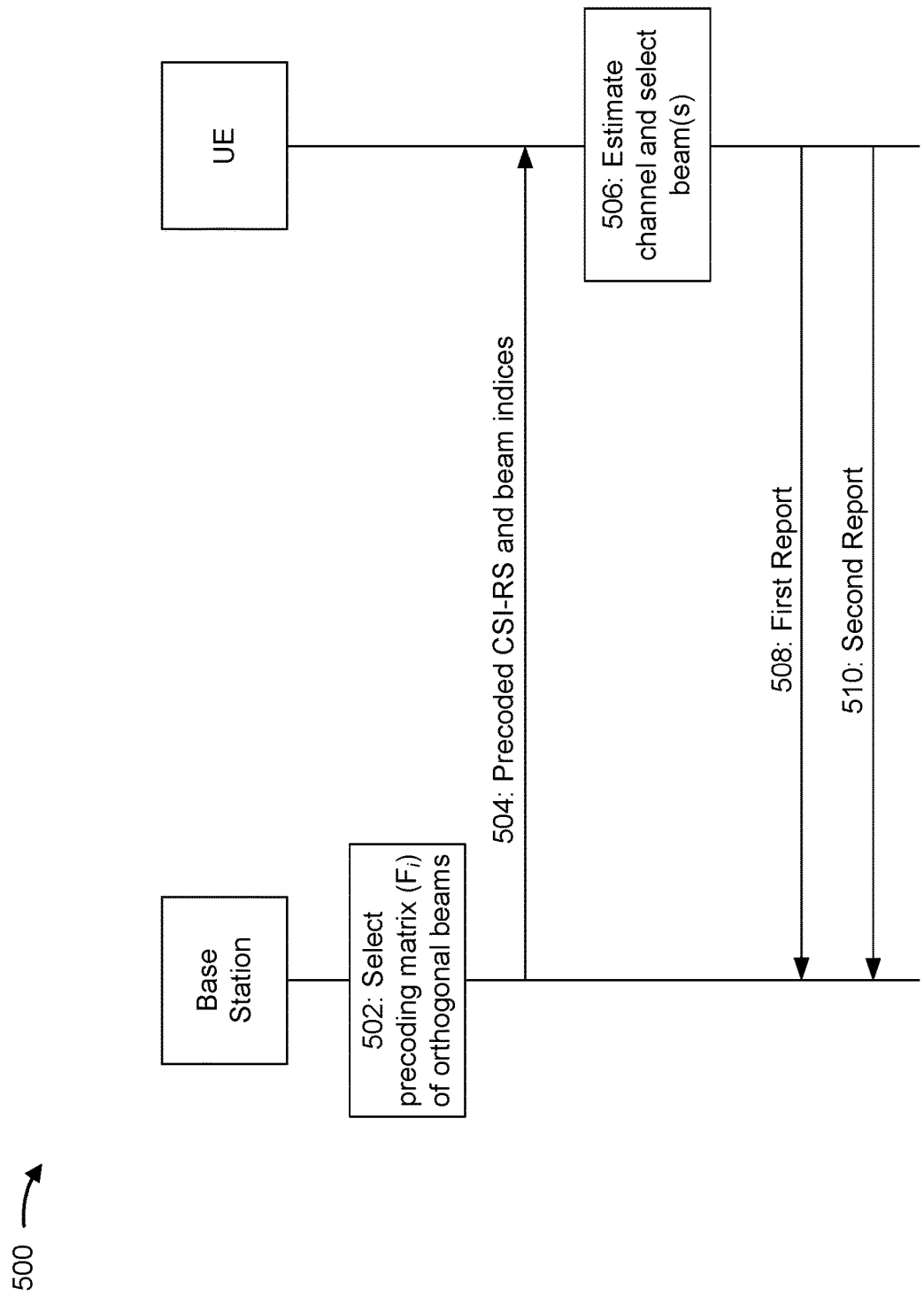
FIG. 5 is a diagram illustrating an example associated with beam index reporting based at least in part on a precoded channel state information reference signal (CSI-RS), in accordance with the present disclosure.

FIG. 5 is a diagram illustrating an example 500 associated with beam index reporting based at least in part on a precoded CSI-RS, in accordance with the present disclosure. As shown in FIG. 5, example 500 includes communication between a base station (e.g., base station 110) and a UE (e.g., UE 120). In some aspects, the base station and the UE may be included in a wireless network such as wireless network 100. The base station and the UE may communicate on a wireless access link, which may include an uplink and a downlink.

As shown by reference number 502, the base station may select a precoding matrix (e.g., submatrix $F_i$) of orthogonal beams. The precoding matrix of orthogonal beams may be a subset or a submatrix of a plurality of beams (e.g., all beams) included in a matrix F. The matrix F may have dimensions based at least in part on $O_1$, $O_2$, $N_1$, and $N_2$, wherein $O_1$ and $O_2$ indicate discrete Fourier transform (DFT) oversampling values, and $N_1$ and $N_2$ are based at least in part on a number of antennas in a horizontal dimension and a vertical dimension. The matrix F may be divided to form the precoding matrix of orthogonal beams. The base station may use the precoding matrix of orthogonal beams to precode a CSI-RS for transmission to the UE.

In some aspects, the base station may select the precoding matrix of orthogonal beams ($F_i$) randomly from the matrix F. The base station may blindly select the precoding matrix of orthogonal beams without using information describing a channel between the base station and the UE. The base station may select the precoding matrix of orthogonal beams ($F_i$) such that i is randomly generated from i=1, 2, . . . , $O_1O_2$. The base station may use the blindly selected precoding matrix of orthogonal beams may be used to precode the CSI-RS.

In some aspects, the base station may select the precoding matrix of orthogonal beams ($F_i$) based at least in part on an SRS received from the UE. For example, the base station may receive the SRS from the UE in an uplink. The UE may sound an uplink channel using the SRS with an antenna switching usage, which may be targeted for a downlink CSI acquisition in a reciprocal time division duplex (TDD) system. The base station may determine the precoding matrix of orthogonal beams based at least in part on the SRS by computing orthogonal beams that may result in an improved performance at the UE, and the precoding matrix of orthogonal beams may be used to precode the CSI-RS.

In some aspects, $O_1O_2$ possible orthogonal patterns of size $N_1N_2$ beams may be available. A search complexity at the base station in computing orthogonal beams that may result in an improved performance at the UE may be based at least in part on a signal to noise ratio (SNR) and/or an average spectral efficiency (SPEF) metric.

In some aspects, the base station may identify a single beam based at least in part on the SRS, where the single beam may be expected to result in an improved performance at the UE. The base station may map the single beam to a specific beam index i. The base station may identify a precoding matrix of orthogonal beams ($F_i$) that includes the specific beam index i associated with the single beam.

In some aspects, the base station may select the precoding matrix of orthogonal beams based at least in part on last beam indices indicated in one or more last reports from the UE. For example, the UE may have previously reported "best" beam indices $i_{1,1}$, $i_{1,2}$, which may correspond to beams producing an increased energy on an antenna port as compared to other beams. The base station may use the last reported beam indices of $i_{1,1}$, $i_{1,2}$ received from the UE to determine a precoding matrix of orthogonal beams that includes the $i_{1,1}$, $i_{1,2}$ pair. The precoding matrix of orthogonal beams that includes the $i_{1,1}$, $i_{1,2}$ pair may be denoted by precoder submatrix $F_l$, which may be used to precode the CSI-RS.

In some aspects, the base station may select the precoding matrix of orthogonal beams based at least in part on a most frequently selected beam index from M last beam indices indicated in one or more last reports from the UE, wherein M is a positive integer. For example, the base station may use M last reported beam indices of $i_{1,1}$, $i_{1,2}$ received from the UE to determine a most frequently selected precoding matrix of orthogonal beams that includes a $i_{1,1}$, $i_{1,2}$ pair. The most frequently selected precoding matrix of orthogonal beams that includes the $i_{1,1}$, $i_{1,2}$ pair may be denoted by precoder submatrix $F_j$, which may be used to precode the CSI-RS.

As an example, when M is equal to five, first last reported beam indices of $i_{1,1}$, $i_{1,2}$ may be associated with a precoder submatrix $F_1$, second last reported beam indices of $i_{1,1}$, $i_{1,2}$ may be associated with a precoder submatrix $F_2$, third last reported beam indices of $i_{1,1}$, $i_{1,2}$ may be associated with a precoder submatrix $F_3$, fourth last reported beam indices of $i_{1,1}$, $i_{1,2}$ may be associated with a precoder submatrix $F_1$, and fifth last reported beam indices of $i_{1,1}$, $i_{1,2}$ may be associated with a precoder submatrix $F_1$. In this example, $F_1$ may be the most frequently selected precoding matrix of orthogonal beams that includes the $i_{1,1}$, $i_{1,2}$ pair, and $F_1$ may be used to precode the CSI-RS.

In some aspects, the base station may transmit an indication of M via radio resource control (RRC) signaling, a medium access control (MAC) control element (CE), or downlink control information (DCI).

As shown by reference number 504, the base station may transmit the precoded CSI-RS to the UE. The base station may also transmit beam indices (e.g., index i, where i=1, 2, . . . , $O_1O_2$ and $F_iF_j=I\ \delta_{ij}$ with $\delta_{ij}=1$ for i=j) associated with the precoding matrix of orthogonal beams used to precode the CSI-RS.

In some aspects, the base station may not report a matrix precoder index or beam index (e.g., $i_{1,1}$, $i_{1,2}$) when the base station selects the precoding matrix of orthogonal beams based at least in part on last beam indices indicated in one or more last reports from the UE, and/or when the base station selects the precoding matrix of orthogonal beams based at least in part on a most frequently selected beam index from M last beam indices indicated in one or more last reports from the UE. In these cases, the UE may determine whether the base station is using the matrix precoder index or beam index (e.g., $i_{1,1}$, $i_{1,2}$).

In some aspects, the base station may notify the UE that the precoding matrix of orthogonal beams may be selected based at least in part on the last beam indices or the most frequently selected beam index from M last beam indices via RRC signaling, a MAC CE, and/or dynamically through DCI.

As shown by reference number 506, the UE may estimate a channel between the UE and the base station. For example, the UE may estimate a precoded channel H $F_j$ based at least in part on the precoded CSI-RS (e.g., CSI-RS pilots) received from the base station. The UE may receive the beam indices (e.g., index i, where i=1, 2, . . . , $O_1O_2$ and $F_iF_j=I\ \delta_{ij}$ with $\delta_{ij}=1$ for i=j) associated with the precoding matrix of orthogonal beams used to precode the CSI-RS. Additionally, the UE may perform a $W_1$ computation based at least in part on the beam indices received from the base station.

In some aspects, the UE may select one or more beam indices from beam indices associated with the precoding matrix of orthogonal beams. For example, the UE may identify "best" beam indices (e.g., $i_{1,1}$, $i_{1,2}$), which may correspond to beams producing an increased energy on an antenna port as compared to other beams. The UE may identify the beam indices based at least in part on the beam indices received from the base station.

As shown by reference number 508, the UE may generate a first report having the selected beam indices. The first report may include partial or full information about a $W_1$ precoding matrix, and/or the first report may include partial or full information for inclusion in a second report. The first report may indicate wideband beams $i_{1,1}$, $i_{1,2}$, or wideband beams $i_{1,1}$, $i_{1,2}$ and $i_{1,3}$. For example, in the first report, the UE may indicate $i_{1,1}$, $i_{1,2}$ (which may correspond to indices of the best beam in a two-dimensional space) and $i_{1,3}$ (which may represent a shift $k_1$, $k_2$ to obtain second layer beam relative to the beam defined by $i_{1,1}$, $i_{1,2}$).

In some aspects, the UE may transmit the first report on a first uplink grant assigned after a period (e.g., a symbol duration defined by a $Z_0'$ value) of receiving the CSI-RS. The UE may be configured to transmit the first report based at least in part on RRC signaling or a MAC CE received from the base station. The UE may receive the RRC signaling or the MAC CE at least a defined number of symbols before the first reporting.

As shown by reference number 510, the UE may generate a second report having updated beam indices. The updated beam indices may be updated in relation to the selected beam indices included in the first report. The second report may include partial or full information about the $W_1$ precoding matrix, information about a $W_2$ precoder, as well as other information, such as channel rank information, a channel quality indicator (CQI), and/or an RSRP. The second report may indicate updated wideband beams $i_{1,1}$, $i_{1,2}$, or updated wideband beams $i_{1,1}$, $i_{1,2}$ and $i_{1,3}$. For example, in the second report, the UE may indicate an updated $i_{1,1}$, $i_{1,2}$ (which may correspond to indices of the best beam in a two-dimensional space) and $i_{1,3}$ (which may represent the shift $k_1$, $k_2$ to obtain second layer beam relative to the beam defined by $i_{1,1}$, $i_{1,2}$).

In some aspects, the UE may transmit the second report on a second uplink grant assigned after a period (e.g., a symbol duration defined by a $Z_1'$ value) of receiving the CSI-RS. The UE may be configured to transmit the second report based at least in part on RRC signaling or a MAC CE received from the base station. The UE may receive the RRC signaling or the MAC CE at least a defined number of symbols before the second reporting.

In some aspects, the techniques described above may improve downlink data precoding performed by the base station since the first report may include updated wideband precoders to be used for downlink data precoding, until a full CSI report is completed at the UE. In addition, if the UE is a low capability UE (e.g., a low power UE), the UE may relay on the precoded CSI-RS to obtain a $W_2$ selection precoder and complete the CSI report, which may save modem cycles at the UE.

As indicated above, FIG. 5 is provided as an example. Other examples may differ from what is described with regard to FIG. 5.

Figure 6:
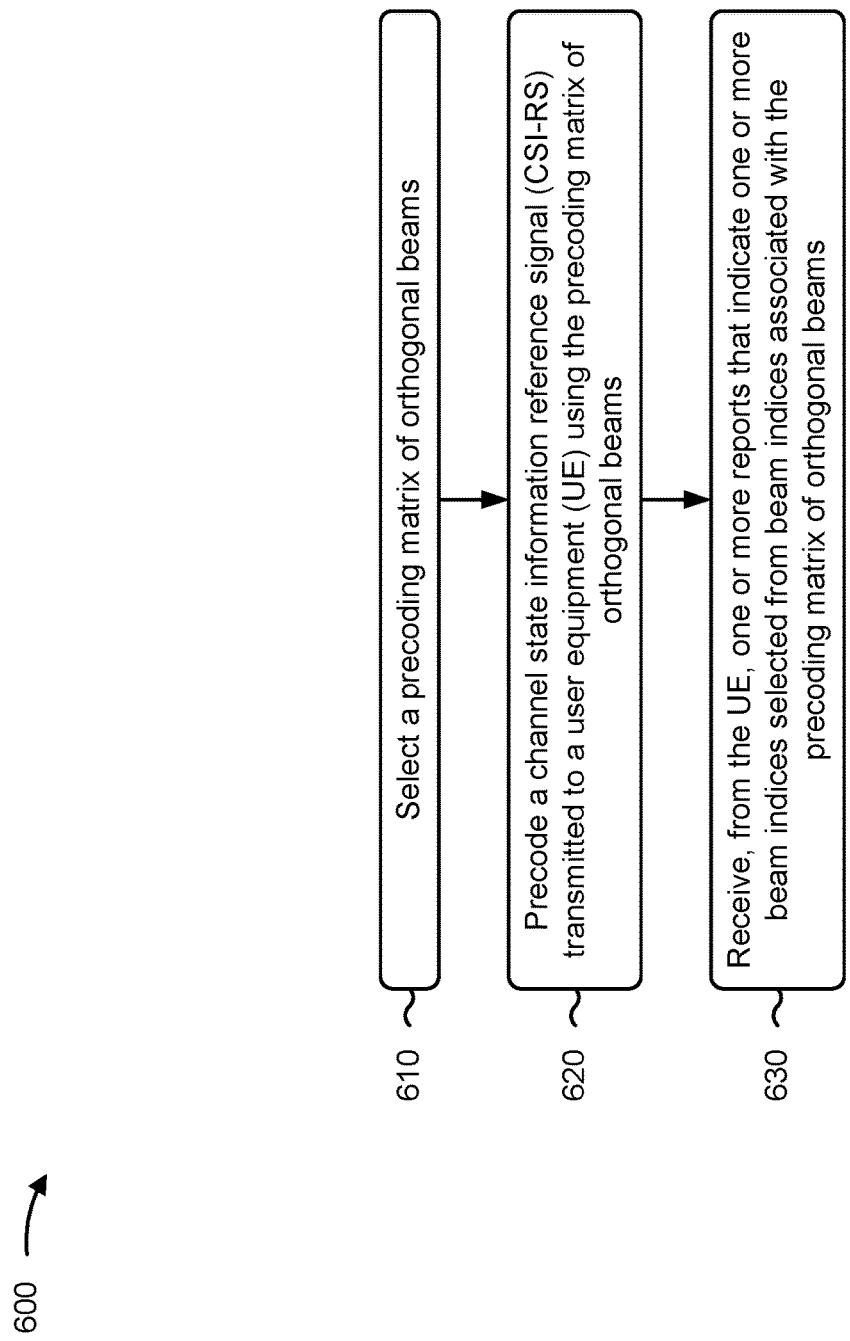
FIGS. 6-7 are diagrams illustrating example processes associated with beam index reporting based at least in part on a precoded CSI-RS, in accordance with the present disclosure.

FIG. 6 is a diagram illustrating an example process 600 performed, for example, by a base station, in accordance with the present disclosure. Example process 600 is an example where the base station (e.g., base station 110) performs operations associated with beam index reporting based at least in part on a precoded CSI-RS.

As shown in FIG. 6, in some aspects, process 600 may include selecting a precoding matrix of orthogonal beams (block 610). For example, the base station (e.g., using transmit processor 220, TX MIMO processor 230, modulator 232, antenna 234, demodulator 232, MIMO detector 236, receive processor 238, controller/processor 240, memory 242, and/or scheduler 246) may select a precoding matrix of orthogonal beams, as described above.

As further shown in FIG. 6, in some aspects, process 600 may include precoding a CSI-RS transmitted to a UE using the precoding matrix of orthogonal beams (block 620). For example, the base station (e.g., using transmit processor 220, TX MIMO processor 230, modulator 232, antenna 234, demodulator 232, MIMO detector 236, receive processor 238, controller/processor 240, memory 242, and/or scheduler 246) may precode a CSI-RS transmitted to a UE using the precoding matrix of orthogonal beams, as described above.

As further shown in FIG. 6, in some aspects, process 600 may include receiving, from the UE, one or more reports that indicate one or more beam indices selected from beam indices associated with the precoding matrix of orthogonal beams (block 630). For example, the base station (e.g., using antenna 234, demodulator 232, MIMO detector 236, receive processor 238, controller/processor 240, and/or memory 242) may receive, from the UE, one or more reports that indicate one or more beam indices selected from beam indices associated with the precoding matrix of orthogonal beams, as described above.

Process 600 may include additional aspects, such as any single aspect or any combination of aspects described below and/or in connection with one or more other processes described elsewhere herein.

In a first aspect, process 600 includes dividing a matrix having dimensions based at least in part on $O_1$, $O_2$, $N_1$, and $N_2$ to form the precoding matrix of orthogonal beams, wherein $O_1$ and $O_2$ indicate DFT oversampling values, and $N_1$ and $N_2$ are based at least in part on a number of antennas in a horizontal dimension and a vertical dimension.

In a second aspect, alone or in combination with the first aspect, selecting the precoding matrix of orthogonal beams comprises selecting the precoding matrix of orthogonal beams randomly from the matrix having dimensions based at least in part on $O_1$, $O_2$, $N_1$, and $N_2$.

In a third aspect, alone or in combination with one or more of the first and second aspects, selecting the precoding matrix of orthogonal beams comprises selecting the precoding matrix of orthogonal beams based at least in part on a sounding reference signal received from the UE.

In a fourth aspect, alone or in combination with one or more of the first through third aspects, selecting the precoding matrix of orthogonal beams comprises selecting the precoding matrix of orthogonal beams based at least in part on last beam indices indicated in one or more last reports from the UE.

In a fifth aspect, alone or in combination with one or more of the first through fourth aspects, selecting the precoding matrix of orthogonal beams comprises selecting the precoding matrix of orthogonal beams based at least in part on a most frequently selected beam index from M last beam indices indicated in one or more last reports from the UE, wherein M is a positive integer.

In a sixth aspect, alone or in combination with one or more of the first through fifth aspects, process 600 includes transmitting, to the UE, an indication of M via RRC signaling, a MAC CE, or DCI.

In a seventh aspect, alone or in combination with one or more of the first through sixth aspects, the one or more reports includes a first report that indicates one or more beam indices selected by the UE.

In an eighth aspect, alone or in combination with one or more of the first through seventh aspects, the one or more reports includes a second report that indicates one or more updated beam indices selected by the UE.

In a ninth aspect, alone or in combination with one or more of the first through eighth aspects, process 600 includes transmitting, to the UE, beam indices associated with the precoding matrix of orthogonal beams used to precode the CSI-RS.

Although FIG. 6 shows example blocks of process 600, in some aspects, process 600 may include additional blocks, fewer blocks, different blocks, or differently arranged blocks than those depicted in FIG. 6. Additionally, or alternatively, two or more of the blocks of process 600 may be performed in parallel.

Figure 7:
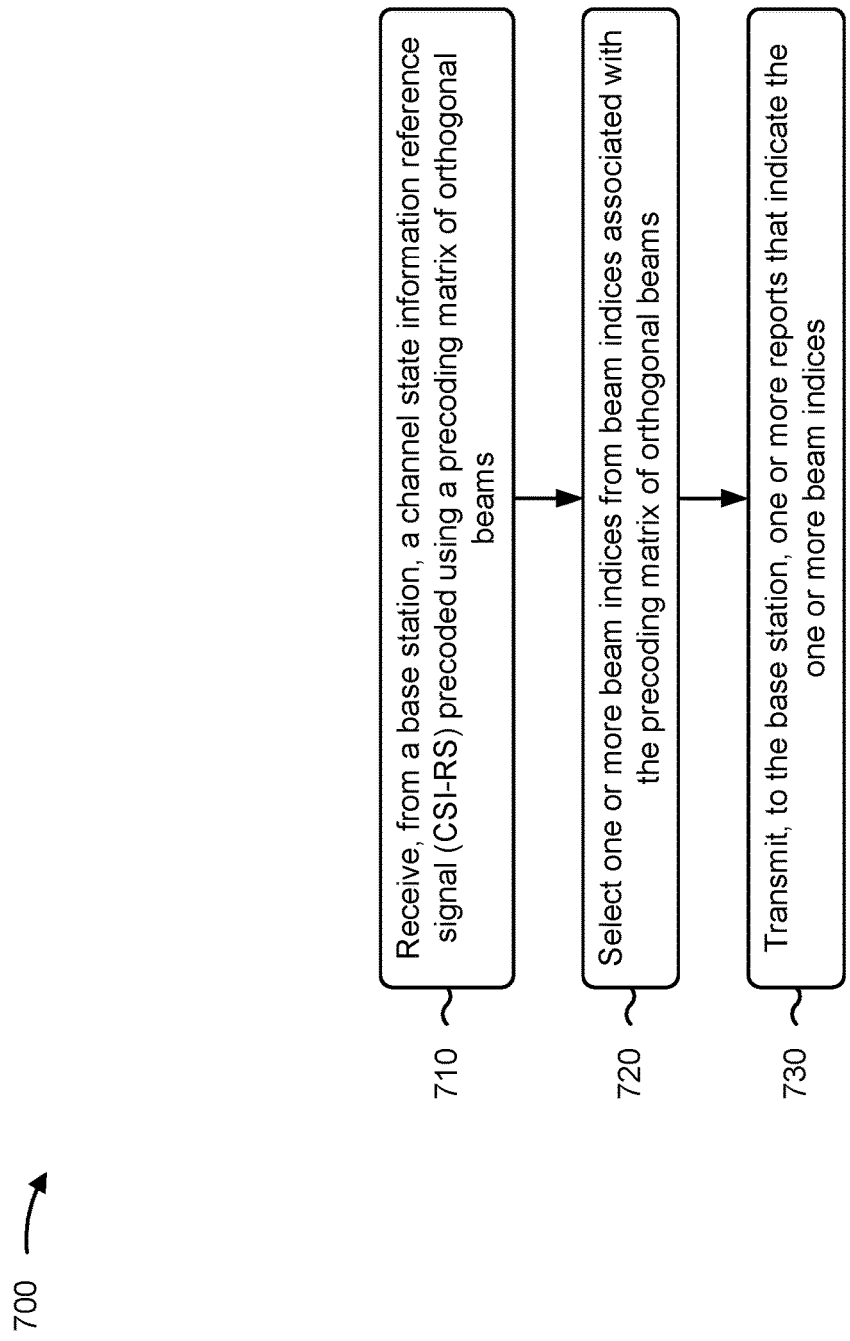

FIG. 7 is a diagram illustrating an example process 700 performed, for example, by a UE, in accordance with the present disclosure. Example process 700 is an example where the UE (e.g., UE 120) performs operations associated with beam index reporting based at least in part on a precoded CSI-RS.

As shown in FIG. 7, in some aspects, process 700 may include receiving, from a base station, a CSI-RS precoded using a precoding matrix of orthogonal beams (block 710). For example, the UE (e.g., using antenna 234, demodulator 232, MIMO detector 236, receive processor 238, controller/processor 240, and/or memory 242; and/or using antenna 252, demodulator 254, MIMO detector 256, receive processor 258, controller/processor 280, and/or memory 282) may receive, from a base station, a CSI-RS precoded using a precoding matrix of orthogonal beams, as described above.

As further shown in FIG. 7, in some aspects, process 700 may include selecting one or more beam indices from beam indices associated with the precoding matrix of orthogonal beams (block 720). For example, the UE (e.g., using transmit processor 220, TX MIMO processor 230, modulator 232, antenna 234, demodulator 232, MIMO detector 236, receive processor 238, controller/processor 240, memory 242, and/or scheduler 246; and/or using antenna 252, demodulator 254, MIMO detector 256, receive processor 258, transmit processor 264, TX MIMO processor 266, modulator 254, controller/processor 280, and/or memory 282) may select one or more beam indices from beam indices associated with the precoding matrix of orthogonal beams, as described above.

As further shown in FIG. 7, in some aspects, process 700 may include transmitting, to the base station, one or more reports that indicate the one or more beam indices (block 730). For example, the UE (e.g., using transmit processor 220, TX MIMO processor 230, modulator 232, antenna 234, controller/processor 240, memory 242, and/or scheduler 246; and/or using antenna 252, transmit processor 264, TX MIMO processor 266, modulator 254, controller/processor 280, and/or memory 282) may transmit, to the base station, one or more reports that indicate the one or more beam indices, as described above.

Process 700 may include additional aspects, such as any single aspect or any combination of aspects described below and/or in connection with one or more other processes described elsewhere herein.

In a first aspect, the precoding matrix of orthogonal beams is a sub-matrix of a matrix having dimensions based at least in part on $O_1$, $O_2$, $N_1$, and $N_2$, wherein $O_1$ and $O_2$ indicate DFT oversampling values, and $N_1$ and $N_2$ are based at least in part on a number of antennas in a horizontal dimension and a vertical dimension.

In a second aspect, alone or in combination with the first aspect, the precoding matrix of orthogonal beams is randomly selected from the matrix having dimensions based at least in part on $O_1$, $O_2$, $N_1$, and $N_2$.

In a third aspect, alone or in combination with one or more of the first and second aspects, process 700 includes transmitting a sounding reference signal to the base station, wherein the precoding matrix of orthogonal beams is selected based at least in part on the sounding reference signal.

In a fourth aspect, alone or in combination with one or more of the first through third aspects, the precoding matrix of orthogonal beams is selected based at least in part on last beam indices indicated in one or more last reports from the UE.

In a fifth aspect, alone or in combination with one or more of the first through fourth aspects, the precoding matrix of orthogonal beams is selected based at least in part on a most frequently selected beam index from M last beam indices indicated in one or more last reports from the UE, wherein M is a positive integer.

In a sixth aspect, alone or in combination with one or more of the first through fifth aspects, process 700 includes receiving, from the base station, an indication of M via RRC signaling, a MAC CE, or DCI.

In a seventh aspect, alone or in combination with one or more of the first through sixth aspects, the one or more reports includes a first report that indicates the one or more beam indices.

In an eighth aspect, alone or in combination with one or more of the first through seventh aspects, process 700 includes selecting one or more updated beam indices that are updates to the one or more beam indices indicated in the first report, wherein the one or more reports includes a second report that indicates the one or more updated beam indices.

In a ninth aspect, alone or in combination with one or more of the first through eighth aspects, process 700 includes receiving, from the base station, beam indices associated with the precoding matrix of orthogonal beams used to precode the CSI-RS.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

Figure 8:
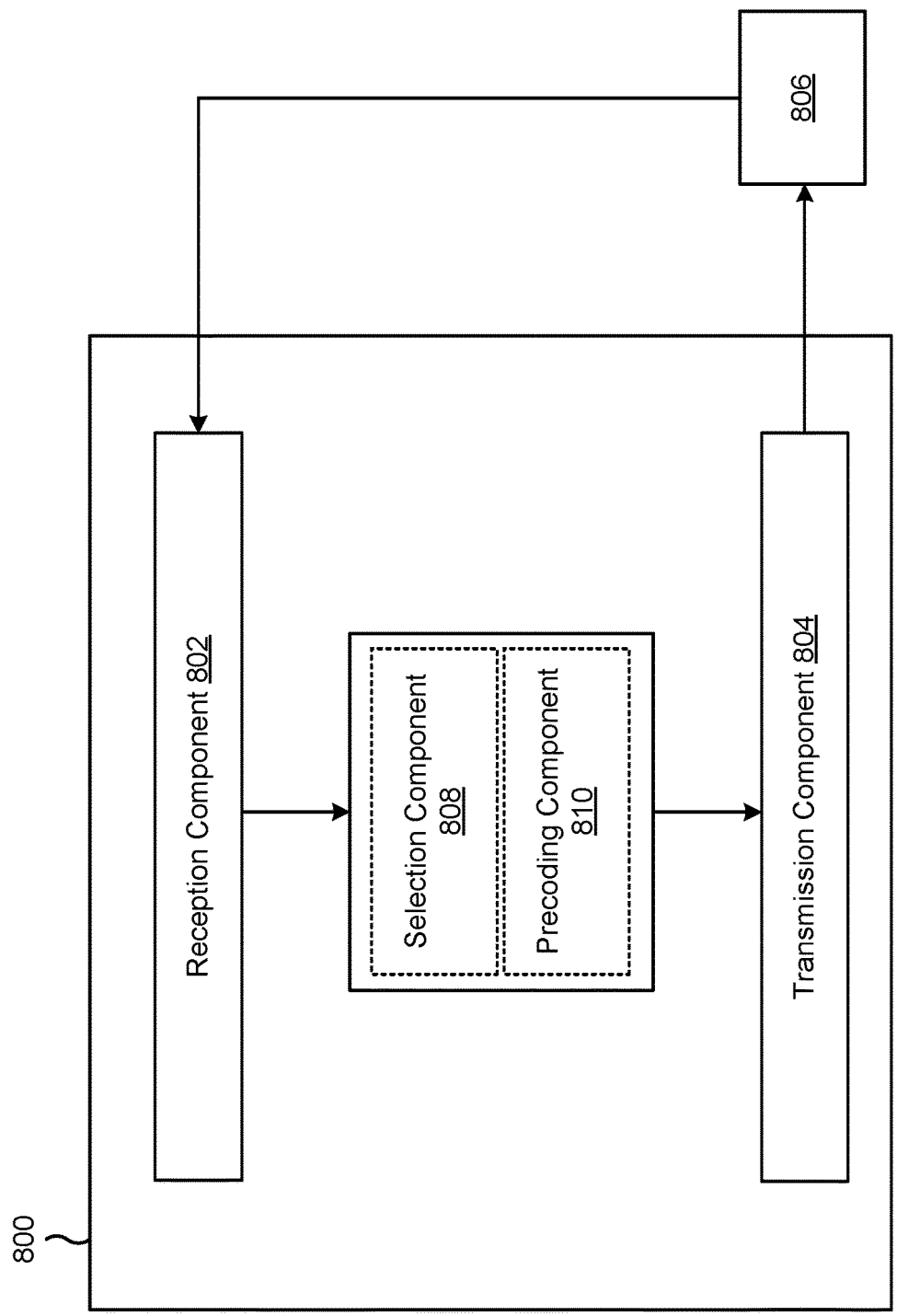
FIGS. 8-9 are block diagrams of example apparatuses for wireless communication, in accordance with the present disclosure.

FIG. 8 is a block diagram of an example apparatus 800 for wireless communication. The apparatus 800 may be a base station, or a base station may include the apparatus 800. In some aspects, the apparatus 800 includes a reception component 802 and a transmission component 804, which may be in communication with one another (for example, via one or more buses and/or one or more other components). As shown, the apparatus 800 may communicate with another apparatus 806 (such as a UE, a base station, or another wireless communication device) using the reception component 802 and the transmission component 804. As further shown, the apparatus 800 may include one or more of a selection component 808, or a precoding component 810, among other examples.

In some aspects, the apparatus 800 may be configured to perform one or more operations described herein in connection with FIG. 5. Additionally, or alternatively, the apparatus 800 may be configured to perform one or more processes described herein, such as process 600 of FIG. 6. In some aspects, the apparatus 800 and/or one or more components shown in FIG. 8 may include one or more components of the base station described above in connection with FIG. 2. Additionally, or alternatively, one or more components shown in FIG. 8 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 802 may receive communications, such as reference signals, control information, data communications, or a combination thereof, from the apparatus 806. The reception component 802 may provide received communications to one or more other components of the apparatus 800. In some aspects, the reception component 802 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 806. In some aspects, the reception component 802 may include one or more antennas, a demodulator, a MIMO detector, a receive processor, a controller/processor, a memory, or a combination thereof, of the base station described above in connection with FIG. 2.

The transmission component 804 may transmit communications, such as reference signals, control information, data communications, or a combination thereof, to the apparatus 806. In some aspects, one or more other components of the apparatus 806 may generate communications and may provide the generated communications to the transmission component 804 for transmission to the apparatus 806. In some aspects, the transmission component 804 may perform signal processing on the generated communications (such as filtering, amplification, modulation, digital-to-analog conversion, multiplexing, interleaving, mapping, or encoding, among other examples), and may transmit the processed signals to the apparatus 806. In some aspects, the transmission component 804 may include one or more antennas, a modulator, a transmit MIMO processor, a transmit processor, a controller/processor, a memory, or a combination thereof, of the base station described above in connection with FIG. 2. In some aspects, the transmission component 804 may be co-located with the reception component 802 in a transceiver.

The selection component 808 may select a precoding matrix of orthogonal beams. In some aspects, the selection component 808 may include one or more antennas, a demodulator, a MIMO detector, a receive processor, a modulator, a transmit MIMO processor, a transmit processor, a controller/processor, a memory, or a combination thereof, of the base station described above in connection with FIG. 2. The precoding component 810 may precode a CSI-RS transmitted to a UE using the precoding matrix of orthogonal beams. In some aspects, the precoding component 810 may include one or more antennas, a demodulator, a MIMO detector, a receive processor, a modulator, a transmit MIMO processor, a transmit processor, a controller/processor, a memory, or a combination thereof, of the base station described above in connection with FIG. 2. The reception component 802 may receive, from the UE, one or more reports that indicate one or more beam indices selected from beam indices associated with the precoding matrix of orthogonal beams.

The selection component 808 may divide a matrix having dimensions based at least in part on $O_1$, $O_2$, $N_1$, and $N_2$ to form the precoding matrix of orthogonal beams, wherein $O_1$ and $O_2$ indicate DFT oversampling values, and $N_1$ and $N_2$ are based at least in part on a number of antennas in a horizontal dimension and a vertical dimension. The selection component 808 may select the precoding matrix of orthogonal beams randomly from the matrix having dimensions based at least in part on $O_1$, $O_2$, $N_1$, and $N_2$. The selection component 808 may select the precoding matrix of orthogonal beams based at least in part on a sounding reference signal received from the UE.

The selection component 808 may select the precoding matrix of orthogonal beams based at least in part on last beam indices indicated in one or more last reports from the UE. The selection component 808 may select the precoding matrix of orthogonal beams based at least in part on a most frequently selected beam index from M last beam indices indicated in one or more last reports from the UE, wherein M is a positive integer.

The transmission component 804 may transmit, to the UE, an indication of M via RRC signaling, a MAC CE, or DCI. The transmission component 804 may transmit, to the UE, beam indices associated with the precoding matrix of orthogonal beams used to precode the CSI-RS.

The number and arrangement of components shown in FIG. 8 are provided as an example. In practice, there may be additional components, fewer components, different components, or differently arranged components than those shown in FIG. 8. Furthermore, two or more components shown in FIG. 8 may be implemented within a single component, or a single component shown in FIG. 8 may be implemented as multiple, distributed components. Additionally, or alternatively, a set of (one or more) components shown in FIG. 8 may perform one or more functions described as being performed by another set of components shown in FIG. 8.

Figure 9:
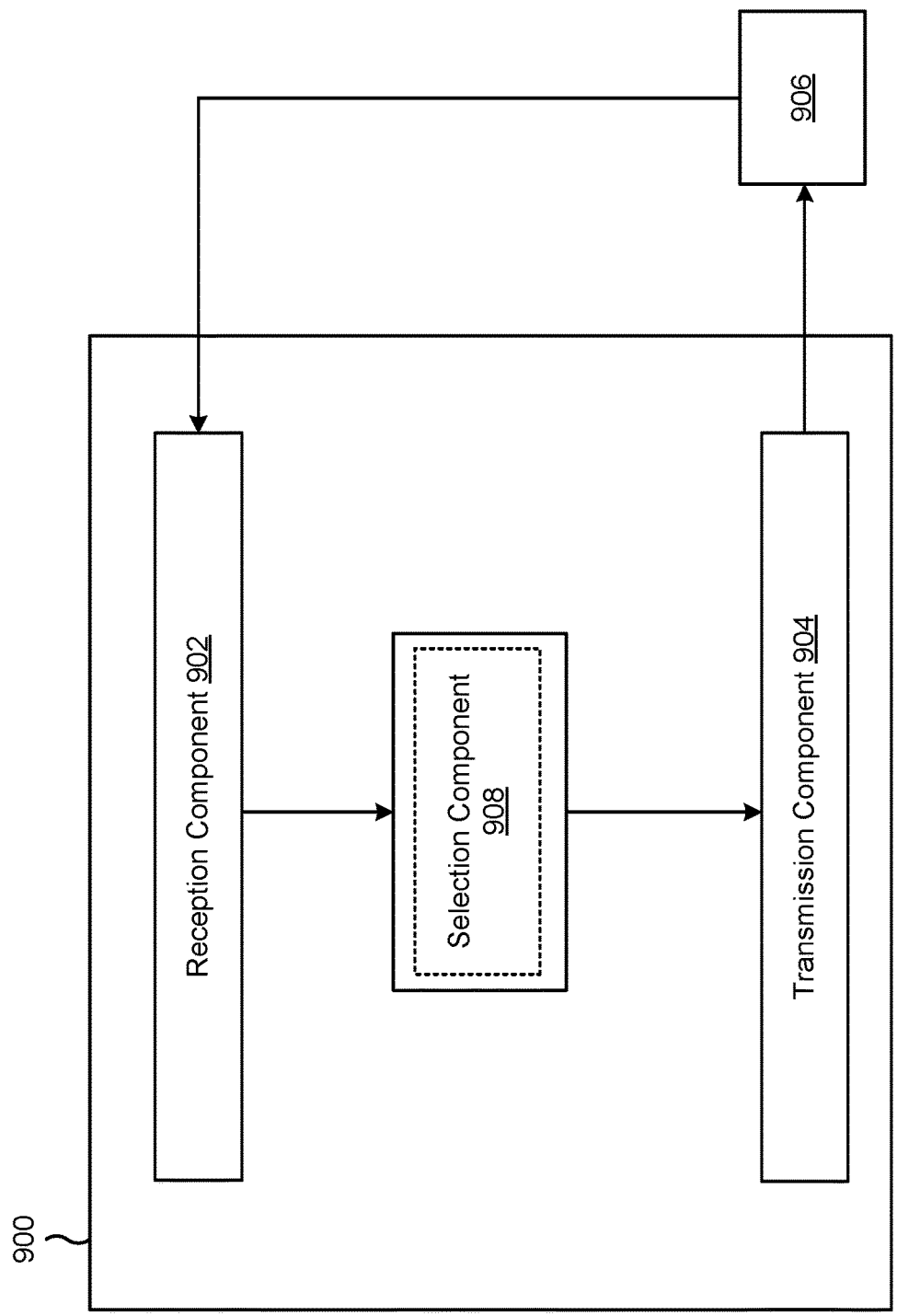

FIG. 9 is a block diagram of an example apparatus 900 for wireless communication. The apparatus 900 may be a UE, or a UE may include the apparatus 900. In some aspects, the apparatus 900 includes a reception component 902 and a transmission component 904, which may be in communication with one another (for example, via one or more buses and/or one or more other components). As shown, the apparatus 900 may communicate with another apparatus 906 (such as a UE, a base station, or another wireless communication device) using the reception component 902 and the transmission component 904. As further shown, the apparatus 900 may include a selection component 908, among other examples.

In some aspects, the apparatus 900 may be configured to perform one or more operations described herein in connection with FIG. 5. Additionally, or alternatively, the apparatus 900 may be configured to perform one or more processes described herein, such as process 700 of FIG. 7. In some aspects, the apparatus 900 and/or one or more components shown in FIG. 9 may include one or more components of the UE described above in connection with FIG. 2. Additionally, or alternatively, one or more components shown in FIG. 9 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 902 may receive communications, such as reference signals, control information, data communications, or a combination thereof, from the apparatus 906. The reception component 902 may provide received communications to one or more other components of the apparatus 900. In some aspects, the reception component 902 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 906. In some aspects, the reception component 902 may include one or more antennas, a demodulator, a MIMO detector, a receive processor, a controller/processor, a memory, or a combination thereof, of the UE described above in connection with FIG. 2.

The transmission component 904 may transmit communications, such as reference signals, control information, data communications, or a combination thereof, to the apparatus 906. In some aspects, one or more other components of the apparatus 906 may generate communications and may provide the generated communications to the transmission component 904 for transmission to the apparatus 906. In some aspects, the transmission component 904 may perform signal processing on the generated communications (such as filtering, amplification, modulation, digital-to-analog conversion, multiplexing, interleaving, mapping, or encoding, among other examples), and may transmit the processed signals to the apparatus 906. In some aspects, the transmission component 904 may include one or more antennas, a modulator, a transmit MIMO processor, a transmit processor, a controller/processor, a memory, or a combination thereof, of the UE described above in connection with FIG. 2. In some aspects, the transmission component 904 may be co-located with the reception component 902 in a transceiver.

The reception component 902 may receive, from a base station, a CSI-RS precoded using a precoding matrix of orthogonal beams. The selection component 908 may select one or more beam indices from beam indices associated with the precoding matrix of orthogonal beams. In some aspects, the selection component 908 may include one or more antennas, a demodulator, a MIMO detector, a receive processor, a modulator, a transmit MIMO processor, a transmit processor, a controller/processor, a memory, or a combination thereof, of the UE described above in connection with FIG. 2. The transmission component 904 may transmit, to the base station, one or more reports that indicate the one or more beam indices.

The transmission component 904 may transmit an SRS to the base station, wherein the precoding matrix of orthogonal beams is selected based at least in part on the SRS.

The reception component 902 may receive, from the base station, an indication of M via RRC signaling, a MAC CE, or DCI.

The selection component 908 may select one or more updated beam indices that are updates to the one or more beam indices indicated in the first report, wherein the one or more reports includes a second report that indicates the one or more updated beam indices.

The reception component 902 may receive, from the base station, beam indices associated with the precoding matrix of orthogonal beams used to precode the CSI-RS.

The number and arrangement of components shown in FIG. 9 are provided as an example. In practice, there may be additional components, fewer components, different components, or differently arranged components than those shown in FIG. 9. Furthermore, two or more components shown in FIG. 9 may be implemented within a single component, or a single component shown in FIG. 9 may be implemented as multiple, distributed components. Additionally, or alternatively, a set of (one or more) components shown in FIG. 9 may perform one or more functions described as being performed by another set of components shown in FIG. 9.

The following provides an overview of some Aspects of the present disclosure:

Aspect 1: A method of wireless communication performed by a base station, comprising: selecting a precoding matrix of orthogonal beams; precoding a channel state information reference signal (CSI-RS) transmitted to a user equipment (UE) using the precoding matrix of orthogonal beams; and receiving, from the UE, one or more reports that indicate one or more beam indices selected from beam indices associated with the precoding matrix of orthogonal beams.

Aspect 2: The method of Aspect 1, wherein selecting the precoding matrix of orthogonal beams comprises: dividing a matrix having dimensions based at least in part on $O_1$, $O_2$, $N_1$, and $N_2$ to form the precoding matrix of orthogonal beams, wherein $O_1$ and $O_2$ indicate discrete Fourier transform (DFT) oversampling values, and $N_1$ and $N_2$ are based at least in part on a number of antennas in a horizontal dimension and a vertical dimension.

Aspect 3: The method of Aspect 2, wherein selecting the precoding matrix of orthogonal beams comprises: selecting the precoding matrix of orthogonal beams randomly from the matrix having dimensions based at least in part on $O_1$, $O_2$, $N_1$, and $N_2$.

Aspect 4: The method of any of Aspects 1 through 3, wherein selecting the precoding matrix of orthogonal beams comprises: selecting the precoding matrix of orthogonal beams based at least in part on a sounding reference signal received from the UE.

Aspect 5: The method of any of Aspects 1 through 4, wherein selecting the precoding matrix of orthogonal beams comprises: selecting the precoding matrix of orthogonal beams based at least in part on last beam indices indicated in one or more last reports from the UE.

Aspect 6: The method of any of Aspects 1 through 5, wherein selecting the precoding matrix of orthogonal beams comprises: selecting the precoding matrix of orthogonal beams based at least in part on a most frequently selected beam index from M last beam indices indicated in one or more last reports from the UE, wherein M is a positive integer.

Aspect 7: The method of Aspect 6, further comprising: transmitting, to the UE, an indication of M via radio resource control (RRC) signaling, a medium access control (MAC) control element (CE), or downlink control information (DCI).

Aspect 8: The method of any of Aspects 1 through 7, wherein the one or more reports includes a first report that indicates one or more beam indices selected by the UE.

Aspect 9: The method of any of Aspects 1 through 8, wherein the one or more reports includes a second report that indicates one or more updated beam indices selected by the UE.

Aspect 10: The method of any of Aspects 1 through 9, further comprising: transmitting, to the UE, beam indices associated with the precoding matrix of orthogonal beams used to precode the CSI-RS.

Aspect 11: A method of wireless communication performed by a user equipment (UE), comprising: receiving, from a base station, a channel state information reference signal (CSI-RS) precoded using a precoding matrix of orthogonal beams; selecting one or more beam indices from beam indices associated with the precoding matrix of orthogonal beams; and transmitting, to the base station, one or more reports that indicate the one or more beam indices.

Aspect 12: The method of Aspect 11, wherein the precoding matrix of orthogonal beams is a sub-matrix of a matrix having dimensions based at least in part on $O_1$, $O_2$, $N_1$, and $N_2$, wherein $O_1$ and $O_2$ indicate discrete Fourier transform (DFT) oversampling values, and $N_1$ and $N_2$ are based at least in part on a number of antennas in a horizontal dimension and a vertical dimension.

Aspect 13: The method of Aspect 12, wherein the precoding matrix of orthogonal beams is randomly selected from the matrix having dimensions based at least in part on $O_1$, $O_2$, $N_1$, and $N_2$.

Aspect 14: The method of any of Aspects 11 through 13, further comprising: transmitting a sounding reference signal to the base station, wherein the precoding matrix of orthogonal beams is selected based at least in part on the sounding reference signal.

Aspect 15: The method of any of Aspects 11 through 14, wherein the precoding matrix of orthogonal beams is selected based at least in part on last beam indices indicated in one or more last reports from the UE.

Aspect 16: The method of any of Aspects 11 through 15, wherein the precoding matrix of orthogonal beams is selected based at least in part on a most frequently selected beam index from M last beam indices indicated in one or more last reports from the UE, wherein M is a positive integer.

Aspect 17: The method of Aspect 16, further comprising: receiving, from the base station, an indication of M via radio resource control (RRC) signaling, a medium access control (MAC) control element (CE), or downlink control information (DCI).

Aspect 18: The method of any of Aspects 11 through 17, wherein the one or more reports includes a first report that indicates the one or more beam indices.

Aspect 19: The method of Aspect 18, further comprising: selecting one or more updated beam indices that are updates to the one or more beam indices indicated in the first report, wherein the one or more reports includes a second report that indicates the one or more updated beam indices.

Aspect 20: The method of any of Aspects 11 through 19, further comprising: receiving, from the base station, beam indices associated with the precoding matrix of orthogonal beams used to precode the CSI-RS.

Aspect 21: An apparatus for wireless communication at a device, comprising a processor; memory coupled with the processor; and instructions stored in the memory and executable by the processor to cause the apparatus to perform the method of one or more of Aspects 1-10.

Aspect 22: A device for wireless communication, comprising a memory and one or more processors coupled to the memory, the one or more processors configured to perform the method of one or more of Aspects 1-10.

Aspect 23: An apparatus for wireless communication, comprising at least one means for performing the method of one or more of Aspects 1-10.

Aspect 24: A non-transitory computer-readable medium storing code for wireless communication, the code comprising instructions executable by a processor to perform the method of one or more of Aspects 1-10.

Aspect 25: A non-transitory computer-readable medium storing a set of instructions for wireless communication, the set of instructions comprising one or more instructions that, when executed by one or more processors of a device, cause the device to perform the method of one or more of Aspects 1-10.

Aspect 26: An apparatus for wireless communication at a device, comprising a processor; memory coupled with the processor; and instructions stored in the memory and executable by the processor to cause the apparatus to perform the method of one or more of Aspects 11-20.

Aspect 27: A device for wireless communication, comprising a memory and one or more processors coupled to the memory, the one or more processors configured to perform the method of one or more of Aspects 11-20.

Aspect 28: An apparatus for wireless communication, comprising at least one means for performing the method of one or more of Aspects 11-20.

Aspect 29: A non-transitory computer-readable medium storing code for wireless communication, the code comprising instructions executable by a processor to perform the method of one or more of Aspects 11-20.

Aspect 30: A non-transitory computer-readable medium storing a set of instructions for wireless communication, the set of instructions comprising one or more instructions that, when executed by one or more processors of a device, cause the device to perform the method of one or more of Aspects 11-20.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method of wireless communication performed by a base station, comprising:
    dividing a matrix having dimensions based at least in part on $O_1$, $O_2$, $N_1$, and $N_2$ to form a precoding matrix of orthogonal beams, wherein $O_1$ and $O_2$ indicate discrete Fourier transform (DFT) oversampling values, and $N_1$ and $N_2$ are based at least in part on a number of antennas in a horizontal dimension and a vertical dimension;
    precoding a channel state information reference signal (CSI-RS) transmitted to a user equipment (UE) using the precoding matrix of orthogonal beams; and
    receiving, from the UE, one or more reports that indicate one or more beam indices selected from beam indices associated with the precoding matrix of orthogonal beams.

2. The method of claim 1, further comprising:
    selecting the precoding matrix of orthogonal beams randomly from the matrix having dimensions based at least in part on $O_1$, $O_2$, $N_1$, and $N_2$.

3. The method of claim 1, further comprising:
    selecting the precoding matrix of orthogonal beams based at least in part on a sounding reference signal received from the UE.

4. The method of claim 1, further comprising:
    selecting the precoding matrix of orthogonal beams based at least in part on last beam indices indicated in one or more last reports from the UE.

5. The method of claim 1, further comprising:
    selecting the precoding matrix of orthogonal beams based at least in part on a most frequently selected beam index from M last beam indices indicated in one or more last reports from the UE, wherein M is a positive integer, and further comprising:
    transmitting, to the UE, an indication of M via radio resource control (RRC) signaling, a medium access control (MAC) control element (CE), or downlink control information (DCI).

6. The method of claim 1, wherein the one or more reports includes a first report that indicates one or more beam indices selected by the UE.

7. The method of claim 1, wherein the one or more reports includes a second report that indicates one or more updated beam indices selected by the UE.

8. The method of claim 1, further comprising:
transmitting, to the UE, beam indices associated with the precoding matrix of orthogonal beams used to precode the CSI-RS.

9. A method of wireless communication performed by a user equipment (UE), comprising:
receiving, from a base station, a channel state information reference signal (CSI-RS) precoded using a precoding matrix of orthogonal beams,
wherein the precoding matrix of orthogonal beams is a sub-matrix of a matrix having dimensions based at least in part on $O_1$, $O_2$, $N_1$, and $N_2$, wherein $O_1$ and $O_2$ indicate discrete Fourier transform (DFT) oversampling values, and $N_1$ and $N_2$ are based at least in part on a number of antennas in a horizontal dimension and a vertical dimension;
selecting one or more beam indices from beam indices associated with the precoding matrix of orthogonal beams; and
transmitting, to the base station, one or more reports that indicate the one or more beam indices.

10. The method of claim 9, wherein the precoding matrix of orthogonal beams is randomly selected from the matrix having dimensions based at least in part on $O_1$, $O_2$, $N_1$, and $N_2$.

11. The method of claim 9, further comprising:
transmitting a sounding reference signal to the base station, wherein the precoding matrix of orthogonal beams is selected based at least in part on the sounding reference signal.

12. The method of claim 9, wherein the precoding matrix of orthogonal beams is selected based at least in part on last beam indices indicated in one or more last reports from the UE.

13. The method of claim 9, wherein the precoding matrix of orthogonal beams is selected based at least in part on a most frequently selected beam index from M last beam indices indicated in one or more last reports from the UE, wherein M is a positive integer, and further comprising:
receiving, from the base station, an indication of M via radio resource control (RRC) signaling, a medium access control (MAC) control element (CE), or downlink control information (DCI).

14. The method of claim 9, wherein the one or more reports includes a first report that indicates the one or more beam indices, and further comprising selecting one or more updated beam indices that are updates to the one or more beam indices indicated in the first report, wherein the one or more reports include a second report that indicates the one or more updated beam indices.

15. The method of claim 9, further comprising:
receiving, from the base station, beam indices associated with the precoding matrix of orthogonal beams used to precode the CSI-RS.

16. A base station for wireless communication, comprising:
a memory; and
one or more processors, coupled with the memory and configured to cause the base station to:
select a precoding matrix of orthogonal beams based at least in part on a most frequently selected beam index from M last beam indices indicated in one or more last reports from a user equipment (UE), wherein M is a positive integer;
precode a channel state information reference signal (CSI-RS) transmitted to the UE using the precoding matrix of orthogonal beams; and
receive, from the UE, one or more reports that indicate one or more beam indices selected from beam indices associated with the precoding matrix of orthogonal beams.

17. The base station of claim 16, wherein the one or more processors, when selecting the precoding matrix of orthogonal beams, are configured to cause the base station to:
divide a matrix having dimensions based at least in part on $O_1$, $O_2$, $N_1$, and $N_2$ to form the precoding matrix of orthogonal beams, wherein $O_1$ and $O_2$ indicate discrete Fourier transform (DFT) oversampling values, and $N_1$ and $N_2$ are based at least in part on a number of antennas in a horizontal dimension and a vertical dimension.

18. The base station of claim 17, wherein the one or more processors, when selecting the precoding matrix of orthogonal beams, are configured to cause the base station to:
select the precoding matrix of orthogonal beams randomly from the matrix having dimensions based at least in part on $O_1$, $O_2$, $N_1$, and $N_2$.

19. The base station of claim 16, wherein the one or more processors, when selecting the precoding matrix of orthogonal beams, are configured to cause the base station to:
select the precoding matrix of orthogonal beams based at least in part on a sounding reference signal received from the UE.

20. The base station of claim 16,
wherein the one or more processors are further configured to cause the base station to transmit, to the UE, an indication of M via radio resource control (RRC) signaling, a medium access control (MAC) control element (CE), or downlink control information (DCI).

21. The base station of claim 16, wherein the one or more reports includes a first report that indicates one or more beam indices selected by the UE.

22. The base station of claim 16, wherein the one or more reports includes a second report that indicates one or more updated beam indices selected by the UE.

23. The base station of claim 16, wherein the one or more processors are further configured to cause the base station to:
transmit, to the UE, beam indices associated with the precoding matrix of orthogonal beams used to precode the CSI-RS.

24. A user equipment (UE) for wireless communication, comprising:
a memory; and
one or more processors coupled with the memory and configured to cause the UE to:
receive, from a base station, a channel state information reference signal (CSI-RS) precoded using a precoding matrix of orthogonal beams,
wherein the precoding matrix of orthogonal beams is selected based at least in part on a most frequently selected beam index from M last beam indices indicated in one or more last reports from the UE, wherein M is a positive integer;
select one or more beam indices from beam indices associated with the precoding matrix of orthogonal beams; and
transmit, to the base station, one or more reports that indicate the one or more beam indices.

25. The UE of claim 24, wherein the precoding matrix of orthogonal beams is a sub-matrix of a matrix having dimensions based at least in part on $O_1$, $O_2$, $N_1$, and $N_2$, wherein $O_1$ and $O_2$ indicate discrete Fourier transform (DFT) oversampling values, and $N_1$ and $N_2$ are based at least in part on a number of antennas in a horizontal dimension and a vertical dimension.

26. The UE of claim 25, wherein the precoding matrix of orthogonal beams is randomly selected from the matrix having dimensions based at least in part on $O_1$, $O_2$, $N_1$, and $N_2$.

27. The UE of claim 24, wherein the one or more processors are further configured to cause the UE to:
   transmit a sounding reference signal to the base station, wherein the precoding matrix of orthogonal beams is selected based at least in part on the sounding reference signal.

28. The UE of claim 24, wherein the one or more processors are further configured to cause the UE to receive, from the base station, an indication of M via radio resource control (RRC) signaling, a medium access control (MAC) control element (CE), or downlink control information (DCI).

29. The UE of claim 24, wherein the one or more reports includes a first report that indicates the one or more beam indices, and wherein the one or more processors are further configured to cause the UE to select one or more updated beam indices that are updates to the one or more beam indices indicated in the first report, wherein the one or more reports includes a second report that indicates the one or more updated beam indices.

30. The UE of claim 24, wherein the one or more processors are further configured to cause the UE to:
   receive, from the base station, beam indices associated with the precoding matrix of orthogonal beams used to precode the CSI-RS.

* * * * *